(12) United States Patent
Kang et al.

(10) Patent No.: US 7,649,926 B2
(45) Date of Patent: Jan. 19, 2010

(54) RAKE RECEIVER FOR DS-CDMA UWB SYSTEM AND DS-CDMA RECEIVER HAVING THE SAME

(75) Inventors: Kyu-Min Kang, Daejon (KR); Sang-Sung Choi, Daejon (KR); Kwang-Roh Park, Daejon (KR); Sang-In Cho, Daejon (KR); Sung-Woo Choi, Daejon (KR); Cheol-Ho Shin, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 574 days.

(21) Appl. No.: 11/636,049

(22) Filed: Dec. 8, 2006

(65) Prior Publication Data

US 2007/0133662 A1    Jun. 14, 2007

(30) Foreign Application Priority Data

Dec. 9, 2005    (KR) ...................... 10-2005-0121055

(51) Int. Cl.
*H04B 1/00* (2006.01)
(52) U.S. Cl. .................... 375/148; 375/147; 375/149; 375/150; 375/152; 375/316; 375/341; 375/343; 375/354; 375/356; 375/357; 375/362; 375/367
(58) Field of Classification Search .......... 375/147, 375/148, 149, 150, 152, 316, 341, 343, 354, 375/356, 357, 362, 367
See application file for complete search history.

(56) References Cited

U.S. PATENT DOCUMENTS 6,717,977 B1    4/2004    Lee

FOREIGN PATENT DOCUMENTS

| KR | 10-2006-0026678 | 3/2006 |
| KR | 10-2006-0034582 | 4/2006 |

OTHER PUBLICATIONS

"An Interference-Suppressing Rake Receiver for the CDMA Downlink." Sriram Mudulodu et al. IEEE Signal Processing Letters. © 2004. vol. 11, No. 5, May 2004. pp. 521-524.

*Primary Examiner*—Chieh M Fan
*Assistant Examiner*—Siu M Lee
(74) *Attorney, Agent, or Firm*—Ladas & Parry LLP

(57) ABSTRACT

A rake receiver for DS-CDMA UWB system and a DS-CDMA receiver having the same are provided. The rake receiver includes: a channel estimator for estimating a channel having a predetermined chip duration by using a synchronization acquisition sequence; a tracking module for detecting a channel variation and adjusting a synchronization position value when the channel variation is detected; a first switch for selecting one of an output value of an analog-to-digital converter and an output value of a correlator and outputting the selected value; a second switch for selecting one of the output value of the analog-to-digital converter and the output value of the correlator; and a plurality of demodulators having a parallel processing structure to demodulate received signals by using the channel estimation value inputted from the channel estimator, the synchronization position value stored by the tracking module, and an output value of the second switch.

14 Claims, 7 Drawing Sheets

RAKE RECEIVER FOR DS-CDMA UWB SYSTEM AND DS-CDMA RECEIVER HAVING THE SAME

FIELD OF THE INVENTION

The present invention relates to a rake receiver for an Ultra Wide-Band (UWB) system and an UWB receiver; and, more particularly, to a rake system that has a parallel processing structure and is suitable for a Direct Sequence Code Division Multiple Access (DS-CDMA) UWB system, and an UWB receiver having the same.

DESCRIPTION OF RELATED ART

In recent years, UWB wireless technologies are considered as very promising technologies in wireless communication field, imaging field, sensor field, and so on, because they can wirelessly transmit multimedia data at ultra-high speed, e.g., several hundreds of Mbps to 1 Gbps, and can provide inherent position recognition capability. Basic structures and methods of carrier-free pulse wireless apparatuses using the UWB wireless technologies have been already known. As the commercial use of the communication field has been recently admitted, various methods for utilizing the UWB wireless technologies as a wireless personal area network have been proposed.

The UWB wireless technologies can be classified into single-band technologies and multiband technologies. The single-band technologies include a carrier-free impulse-based scheme and a DS-CDMA scheme using carrier. The multiband technologies include a Frequency-Hopping Orthogonal Frequency Division Multiplexing (FH-OFDM) scheme and a multiband pulse scheme.

Because a DS-CDMA UWB system transmits signals using UWB frequency, serious synchronization error occurs due to multipath fading, phase offset, and frequency offset. To solve this problem, a receiving side includes a module for packet synchronization acquisition and symbol synchronization acquisition. Also, a channel estimator and a rake receiver are used for effectively coping with channel environment changing during a data frame transfer period. However, because multipath fading delay time in the UWB channel is more than 150-200 nsec, intersymbol interference occurring during a data transmission cannot be removed only using the rake receiver. Thus, an equalizer is further provided in the receiving side.

Compared with the UWB system, a general wireless communication system uses a relatively narrower frequency band and a relatively longer spreading code. Therefore, in the wireless communication system, the multipath fading delay time does not exceed one symbol interval. When a transmitter of the wireless communication system transmits a signal using a spreading code having a length L, the rake receiver uses L rake fingers or less.

On the other hand, because the UWB system transmits data using a wideband frequency and a short spreading code, the multipath fading delay caused by the multipath occurs over several symbol intervals. As described above, because the conventional rake receiver for the UWB system has the rake finger with less than one symbol interval at the receiving side and demodulates the receive data using the rake finger, its reception performance is poor. Therefore, in designing the rake receiver for the UWB system, it is preferable that rake fingers corresponding to several symbol intervals are provided so that the receiving side can sufficiently use the signals distributed by the multipath. In addition, the equalizer is further provided for removing the intersymbol interference.

SUMMARY OF THE INVENTION

As is well known, because the UWB system uses UWB frequency band of 500 MHz or more and is installed indoor, it has almost no mobility. Therefore, Doppler frequency spread of UWB channel is close to zero and coherence time is long. Consequently, the channel does not almost change.

It is, therefore, an object of the present invention to provide a rake receiver and an UWB receiver having the same. Considering the UWB channel characteristic, channel estimation values corresponding to several symbol intervals are calculated during a preamble transfer period and used for signal demodulation during a data transfer period. In addition, a tracking module, a rake receiver, and equalizer are organically operated for compensating the channel changing during the data transfer period, thus improving the reception performance.

It is another object of the present invention to provide a rake receiver and an UWB receiver having the same, in which a parallel processing structure is adopted such that the receiver can be applied to spreading codes having lengths of 24 to 1. In addition, 24-chip channel is estimated and the estimated channel is used for signal demodulation. When the system is operated in a mode in which the spreading code has a length of 24 or less, it can be obtained the effect that multiple signals corresponding to a plurality of symbol intervals are processed in the rake receiver, thus improving the reception performance.

In accordance with an aspect of the present invention, there is provided a rake receiver including: a channel estimator for estimating a channel having a predetermined chip duration by using a synchronization acquisition sequence during a preamble transfer period; a tracking module for detecting a channel variation during a data transfer period and adjusting a synchronization position value when the channel variation is detected; a first switch for selecting one of an output value of an analog-to-digital converter and an output value of a correlator according to a length of a spreading code, and outputting the selected value to the tracking module; a second switch for selecting one of the output value of the analog-to-digital converter and the output value of the correlator according to the length of the spreading code; and a plurality of demodulators having a parallel processing structure to demodulate received signals by using the channel estimation value inputted from the channel estimator, the synchronization position value stored by the tracking module, and an output value of the second switch.

In accordance with another aspect of the present invention, there is provided a DS-CDMA receiver including an analog-to-digital converter, a correlator for outputting a correlation value with respect to a predetermined number of signals inputted from the analog-to-digital converter, a rake receiver, an equalizer, and a Viterbi decoder, wherein the rake receiver includes: a channel estimator for estimating a channel having a predetermined chip duration by using a synchronization acquisition sequence during a preamble transfer period; a tracking module for detecting a channel variation during a data transfer period and adjusting a synchronization position value when the channel variation is detected; a first switch for selecting one of an output value of an analog-to-digital converter and an output value of a correlator according to a length of a spreading code and outputting the selected value to the tracking module; a second switch for selecting one of an output value of the analog-to-digital converter and an output value of the correlator according to the length of the spreading code; and a plurality of demodulators having a parallel processing structure to demodulate received signals by using the channel estimation value inputted from the channel estimator, the synchronization position value stored by the tracking module, and an output value of the second switch.

The correlator may include: a fourth buffer having a predetermined chip size and buffering a predetermined number of complex input values received from the analog-to-digital converter; and a plurality of correlation calculators for performing a correlation calculation operation with a spreading code used in a signal transfer by using the complex values outputted from the fourth buffer, and outputting result values, the correlation calculators being provided as many as the predetermined chip size.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
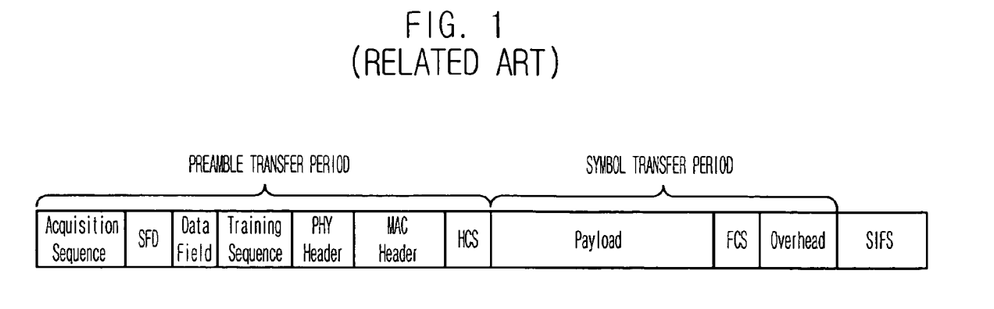
FIG. 1 is a block diagram of a data frame in a DS-CDMA UWB system.

FIG. 1 is a block diagram of a data frame applied to a DS-CDMA UWB system.

Referring to FIG. 1, a preamble transfer period ranges from an initial synchronization acquisition sequence period to a header check sequence (HCS) period, and a symbol transfer period ranges from a payload period to an overhead period. Time necessary for initial synchronization acquisition, automatic gain control, channel estimation, and equalizer convergence in the UWB system is different depending on data transfer distance and channel environment. Thus, a length of the preamble sequence may be variable, e.g., ten microseconds to several ten microseconds.

During the initial synchronization acquisition sequence period of FIG. 1, automatic gain control, initial symbol synchronization and frame synchronization acquisition, decision of channel estimation value, and automatic frequency control (AFC) are performed with respect to a received signal. During a training sequence transfer mode, a filter tap of an equalizer is converged. The initial synchronization acquisition sequence and the training signal are generated from a modem, while a physical layer (PHY) header and a medium access control (MAC) header are generated from a MAC and transmitted to the modem. The HCS is generated from the modem and transfered to an RF module. During the data transfer period, a receiver module including a demodulator, a tracking module, an equalizer, and a Viterbi decoder is continuously operated to recover the received data using the information obtained during the preamble transfer period. In FIG. 1, a start frame delimiter (SFD) of the preamble transfer period is used to indicate a start frame.

Figure 2:
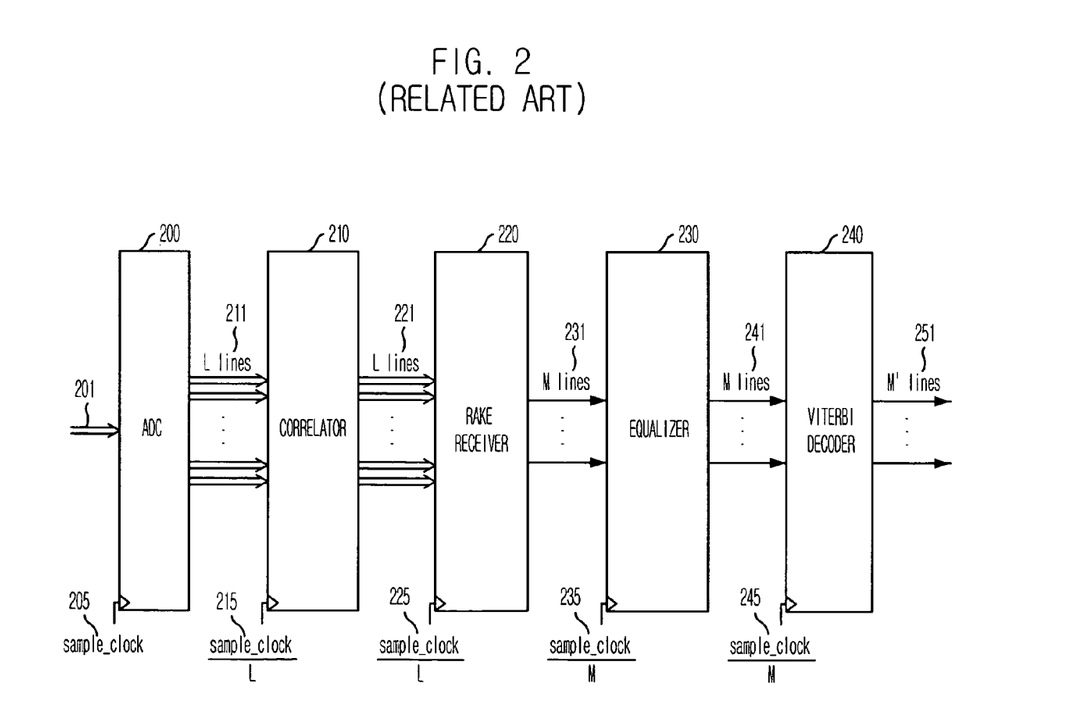
FIG. 2 is a block diagram of a DS-CDMA UWB receiver.

FIG. 2 is a block diagram of a DS-CDMA UWB modem receiver in accordance with an embodiment of the present invention.

Referring to FIG. 2, the DS-CDMA UWB modem receiver includes an analog-to-digital converter (ADC) 200, a correlator 210, a rake receiver 220, an equalizer 230, and a Viterbi decoder 240. An RF processor (not shown) converters received analog passband signals into analog baseband signals 201, and the ADC 200 converts the analog baseband signals 201 into digital signals 211. The correlator 210 processes L signals 211 outputted from the ADC 200 for parallel processing and outputs L complex correlation values 221 to the rake receiver 220. The rake receiver 220 receives the L complex correlation values 221 and outputs M real symbol input values 231 to the equalizer having M parallel processing structures. The equalizer 230 removes intersymbol interference from the M symbol input values 231 and calculates M symbol decision values 241. The Viterbi decoder 240 of the receiver is designed to correspond to a convolutional encoder of the transmitter in order to obtain a coding gain. The Viterbi decoder 240 has M' output values 251, where L>M>M'.

The rake receiver 220 is designed such that it can be applied to modes having the spreading codes having length ranging from 24 to 1. In addition, because the rake receiver 220 is implemented in a parallel processing structure, it can be effectively applied to the UWB system requiring high-speed signal transmission. The rake receiver is used for signal demodulation by estimating a channel having 24-chip duration. For example, when the spreading code length is 6, the rake receiver processes multiple signals corresponding to 4 symbol periods. Therefore, the reception performance can be improved compared with the conventional rake receiver.

Figure 3:
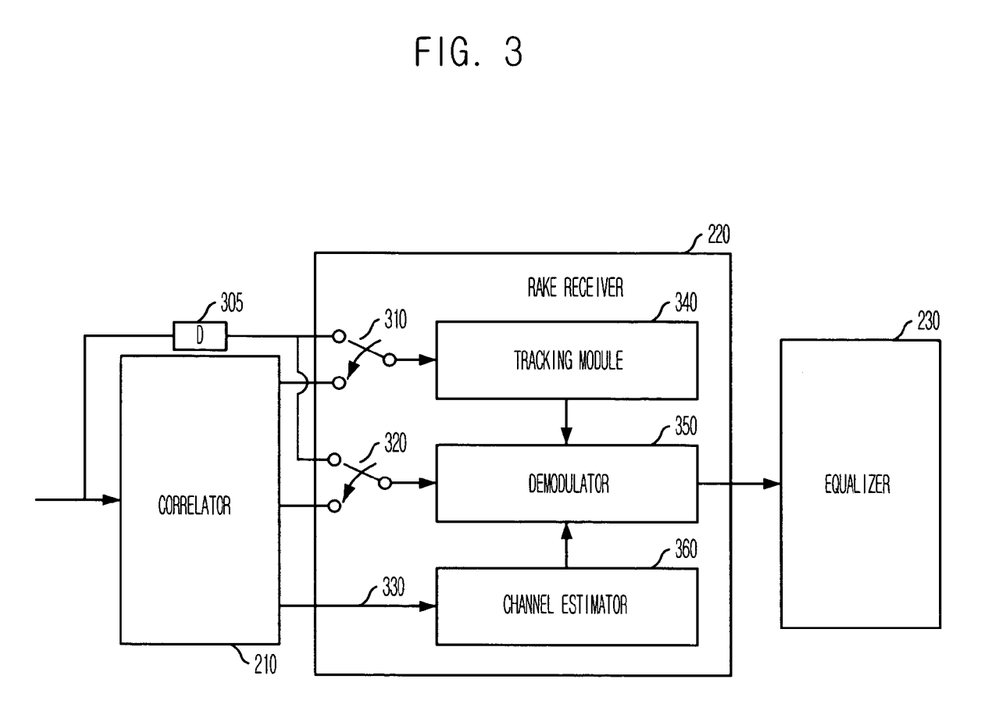
FIG. 3 is a block diagram of a rake receiver for a DS-CDMA UWB system in accordance with an embodiment of the present invention.

FIG. 3 is a block diagram of the rake receiver for the DS-CDMA UWB system in accordance with an embodiment of the present invention.

Referring to FIG. 3, the rake receiver includes a channel estimator 360, a tracking module 340, a demodulator 250 having a parallel processing structure, and a plurality of switches 310 and 320. The channel estimator 360 estimates the 24-chip channel using the synchronization acquisition sequence during the preamble transfer period. The tracking module 340 continuously detects and compensates channel variation during the data transfer period. The demodulator demodulates the signal using the channel estimation values and the inputted values. The switches 310 and 320 select input values to be used in data demodulation and tracking operations.

When the spreading code having a length of 12 or 24 is used, the signal is spreaded using a ternary code. Therefore, the signal demodulation and tracking operation is performed using the output values of the correlator 210 as the input values. On the other hand, when the spreading code having a length of 6 or less is used, the signals outputted from the ADC 200 are used, instead of the output signals of the correlator 210. To this end, the switches 320 are provided to select the input signals of the demodulator and the tracking module. In addition, a buffer 305 is provided for timing synchronization of the input signals from the ADC 200. In other words, the buffer 305 buffers the output signals of the ADC 200. The first switch 310 selects one of the output signal of the buffer 305 and the output signal of the correlator 210 according to a control signal and provides the selected signal to the tracking module 340. The second switch 320 selects one of the output signal of the buffer 305 and the output signal of the correlator 210 and provides the selected signal to the demodulator 350.

The channel estimator 360 estimates the 24-chip channel using the synchronization acquisition sequence during the initial preamble transfer period, and stores the estimation information in the buffer. The demodulator 350 uses the estimation information to demodulate the received data during the data symbol transfer period. The tracking module 340 continuously detects the channel variation during the data transfer period. When the channel variation is detected, the tracking module 340 adjusts an initial synchronization position value stored in a register by using a searcher during the preamble transfer period. The demodulator 350 demodulates the signals inputted through the second switch 320 by using the channel estimation value from the channel estimator 360 and the data from the tracking module, and transfers the demodulated signal to the equalizer 230.

Figure 4:
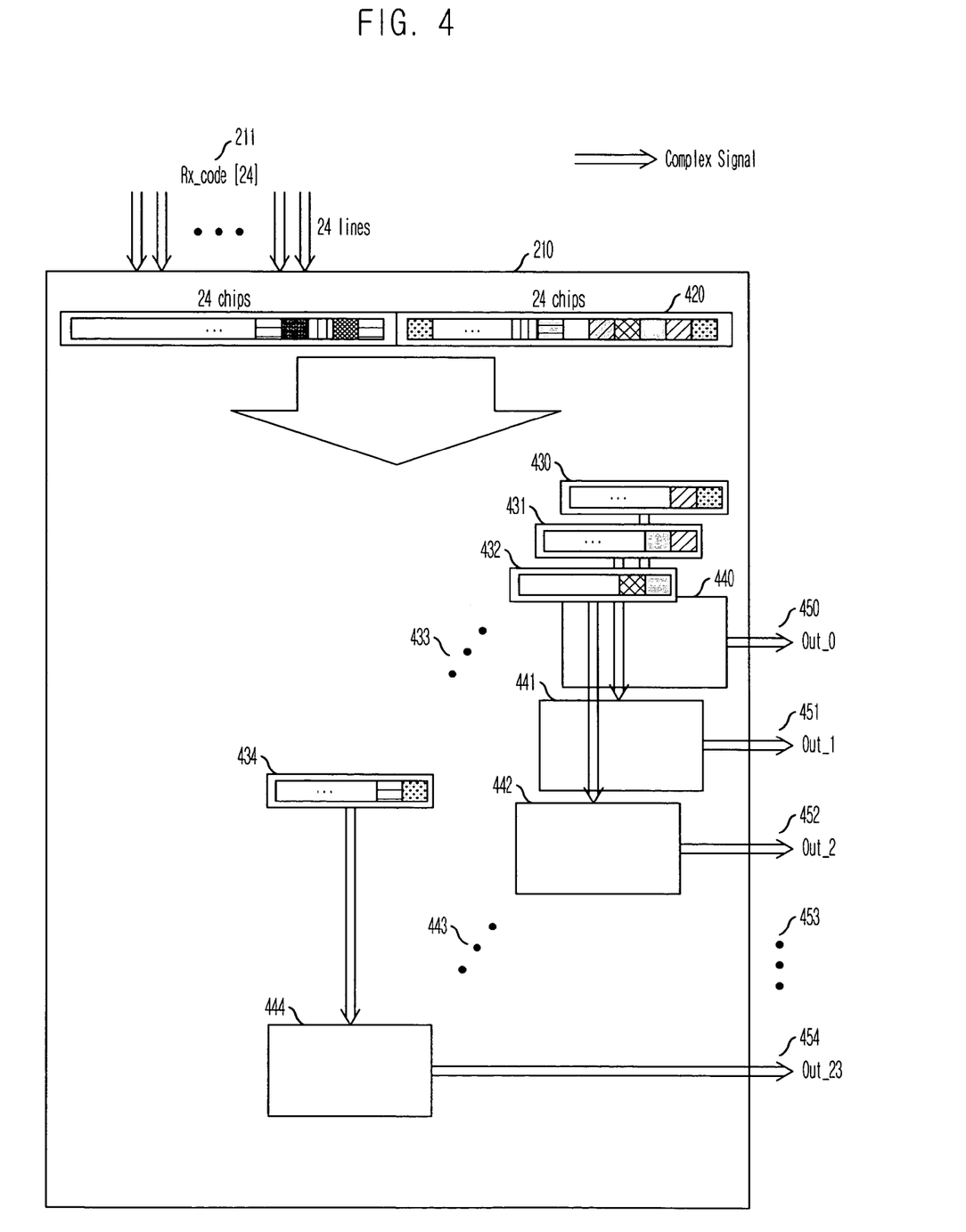
FIG. 4 is a diagram of a correlator in the DS-CDMA UWB receiver in accordance with an embodiment of the present invention.

FIG. 4 is a block diagram of the correlator 210 of the DS-CDMA UWB receiver in accordance with an embodiment of the present invention.

Referring to FIG. 4, the correlator 210 includes a buffer 420 and correlation calculators 440 to 444. The buffer 420 has 48-chip size and receives 24 complex input values Rx_code [24] that are complex signals outputted from the ADC 200. The correlation calculators 440 to 444 perform the correlation operation on the spreading codes used in the signal transmission by using the divided values 430 to 434 of the complex input values outputted from the buffer 420.

Tables 1, 2 and 3 show the lengths of the spreading codes that are applicable to Binary Phase Shift Keying (BPSK) transmission in the DS-CDMA UWB system. AS can be shown in Tables 1, 2 and 3, the lengths of the applicable spreading codes are 24, 12, 6, 4, 3, 2 and 1. Specifically, Table 1 shows ternary spreading codes having a length of 24 for BPSK transmission, Table 2 shows ternary spreading codes having a length of 12, and Table 3 shows spreading codes having lengths of 6, 4, 3, 2 and 1.

TABLE 1

| Code Set Number | L = 24 Codes |
| --- | --- |
| 1 | -1, 0, 1, -1, -1, -1, 1, 1, 0, 1, 1, 1, 1, -1, 1, -1, 1, 1, 1, -1, 1, -1, -1, 1 |
| 2 | -1, -1, -1, -1, 1, -1, 1, -1, 1, -1, -1, 1, -1, 1, 1, -1, -1, 1, 1, -1, 0, 1, 1, |
| 3 | -1, 1, -1, -1, 1, -1, -1, 1, -1, 0, -1, 0, -1, -1, 1, 1, 1, -1, 1, 1, 1, -1 ,-1, -1 |
| 4 | 0, -1, -1, -1, -1, -1, -1, 1, 1, 0, -1, 1, 1, -1, 1, -1, -1, 1, 1, -1, 1, -1, 1, -1 |
| 5 | -1, 1, -1, 1, 1, -1, 1, 0, 1, 1, 1, -1, -1, 1, 1, -1, 1, 1, 1, -1, -1, -1, 0, -1 |
| 6 | 0, -1, -1, 0, 1, -1, 1, 1, -1, -1, 1, 1, 1, 1, -1, -1, 1, -1, 1, 1, 1, 1 |

TABLE 2

| Code Set Number | L = 12 Codes |
| --- | --- |
| 1 | 0, -1, -1, -1, 1, 1, 1, -1, 1, 1, -1, 1 |
| 2 | -1, 1, -1, -1, 1, -1, -1, -1, 1, 1, 1, 0 |
| 3 | 0, -1, 1, -1, -1, 1, -1, -1, -1, -1, 1, 1, 1 |
| 4 | -1, -1, -1, 1, 1, 1, -1, 1, 1, -1, 1, 0 |
| 5 | -1, -1, -1, 1, 1, 1, -1, 1, 1, -1, 1, 0 |
| 6 | 0, -1, -1, -1, 1, 1, 1, -1, 1, 1, -1, 1 |

TABLE 3

| Code Set Numbers | L = 6 Codes | L = 4 Codes | L = 3 Codes | L = 2 Codes | L = 1 Codes |
| --- | --- | --- | --- | --- | --- |
| 1 through 6 | 1, 0, 0, 0, 0, 0 | 1, 0, 0, 0 | 1, 0, 0 | 1, 0 | 1 |

If the correlators are separately designed for the correlation of different lengths, the complexity of the receiver significantly increases. Therefore, one correlator corresponding to the spreading code having 24 chips that are the greatest length is designed. Then, when the spreading code having the length of 24 is used during the transceiver's data transfer, the correlation calculation for 24 chips is performed and its result value is outputted.

It can be seen from Table 3 that the spreading code having the length of 6 does not use ternary code but uses a code similar to that of Time Division Multiple Access (TDMA) scheme. When data is transferred using the spreading code having the length of 6 or less, the rake receiver uses the output values of the ADC, instead of the result values of the correlator.

Regarding the spreading code having length of 24 or less, all values are factors of 24 and thus the receiver can efficiently perform the signal processing. In other words, when the transceiver uses the spreading code having the length of 24 during the data transfer, the despread 24 result values correspond to 1 symbol. In the case of the spreading code having the length of 12, the result values correspond to 2 symbols. In the case of the spreading code having the length of 6, the result values correspond to 4 symbols. In the case of the spreading code having the length of 4, the result values correspond to 6 symbols. In the case of the spreading code having the length of 3, the result values correspond to 8 symbols. In the case of the spreading code-having the length of 2, the result values correspond to 12 symbols. In the case of the spreading code having the length of 1, the result value corresponds to 24 symbols. Although the operation clock of the correlator is 55 MHz, it is possible to provide the data rate of several tens of Mbps up to 1.32 Gbps.

Figure 5:
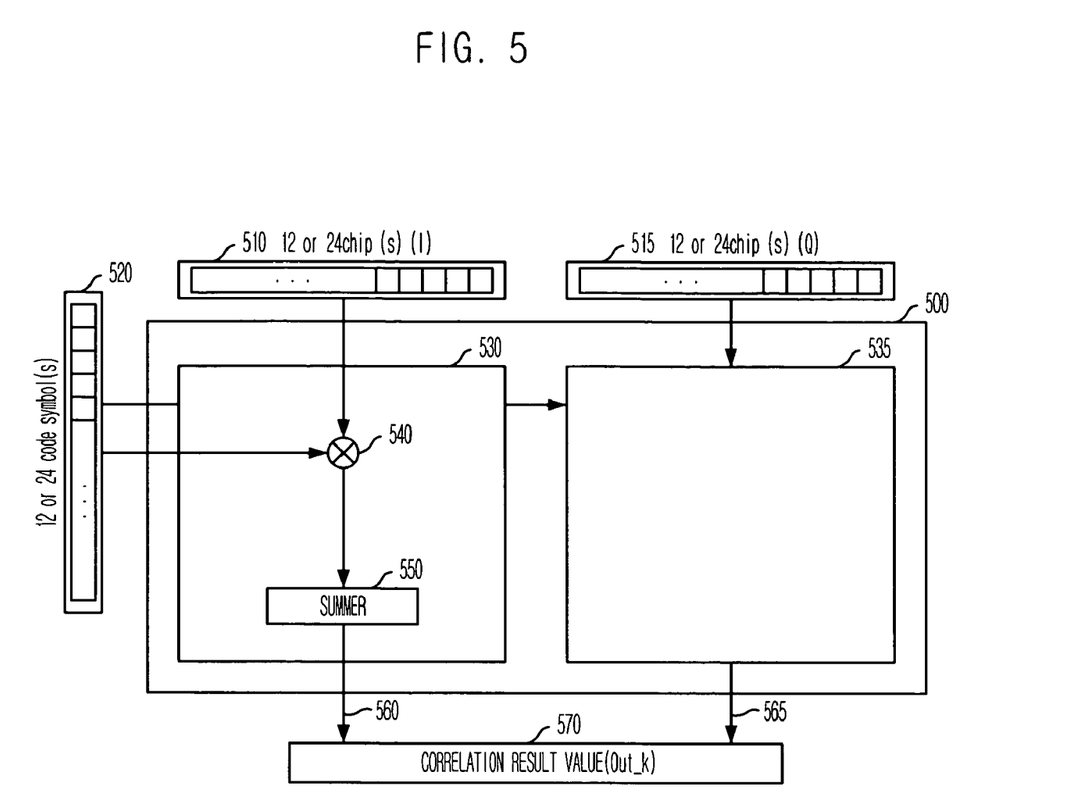
FIG. 5 is a block diagram of a correlation calculator shown in FIG. 4.

FIG. 5 is a block diagram of the correlation calculator of FIG. 4.

Referring to FIG. 5, the complex input value from the 48-chip buffer 420 of the correlator 210 shown in FIG. 4 is divided into 12- or 24-chip real-part input value 510 and imaginary-part input value 515. The real-part input value 510 is inputted to a real-part correlation calculator 530, and the imaginary-part input value is inputted to an imaginary-part correlation calculator 535. The real-part correlation calculator 530 and the imaginary-part correlation calculation calculator 535 have the same structure and output the correlation result value 570 by performing the correlation calculation process with the spreading codes 520 used in the transceiver.

That is, the real-part correlation calculator 530 includes multipliers 540 for multiplying the 12- or 24-chip real-part input value 510 by the spreading code 520, and a summer 550 for summing the output values of the multipliers 540. The summer 550 outputs a real-part value 560 of a predetermined k-th correlation result value (Out_k) 570. The imaginary-part correlation calculator 535 performs the same correlation calculation operation as the real-part correlation calculator 530 and outputs an imaginary-part value 565 of the predetermined k-th correlation result value (Out_k) 570. In this way, the correlation result value with respect to the complex input value outputted from the 48-chip buffer 420 is obtained.

The spreading code used herein is previously stored in the memory in designing the receiver, and the kind of the spreading code used in the transmitter is transferred over the physical layer (PHY) header when the data frame is transmitted. The kind of the spreading code is checked from the PHY header of the data frame received by the receiver and is used in the correlation calculation by referring to the memory storing the spreading codes.

Figure 6:
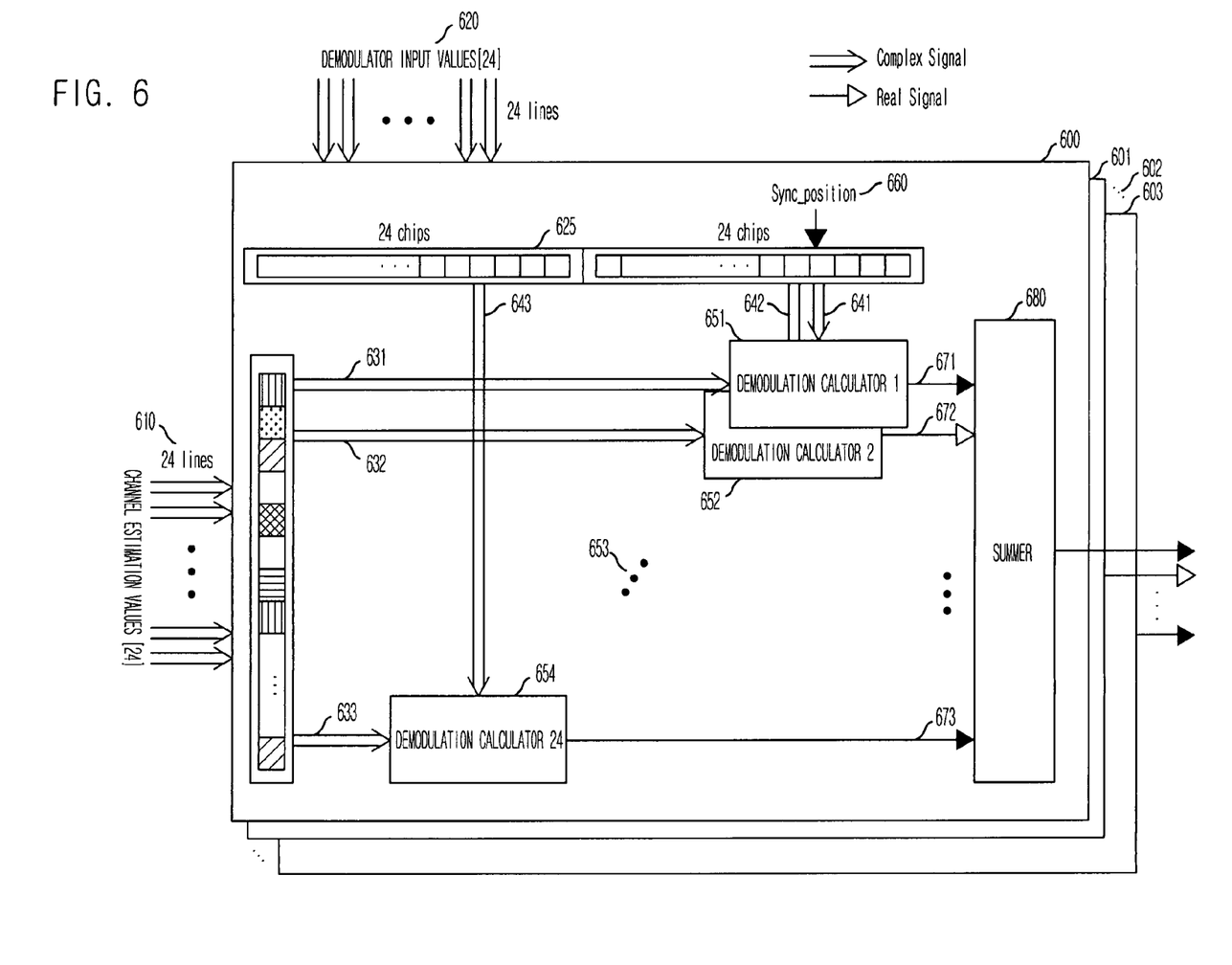
FIG. 6 is a block diagram of a demodulator of the rake receiver in accordance with an embodiment of the present invention.

FIG. 6 is a block diagram of the demodulator of the rake receiver in accordance with an embodiment of the present invention.

Referring to FIG. 6, the demodulator includes a 24-chip buffer 615 for storing the channel estimation values, a 48-chip buffer 625 for storing the demodulator input values, 24 demodulation calculators 651 to 654, and a summer 680.

The channel estimation values 610 of the 24-chip duration obtained during the preamble transfer period using the synchronization acquisition sequence and the ternary spreading code having length of 24 are stored in the 24-chip buffer 615 in order for the symbol demodulation during the data transfer period. Also, when the spreading codes having the length of 12 or 24 are used during the data transfer period, the result values of the correlator 210 are used as the demodulator input values. When the spreading code having the length of 6 or less are used, the signals from the ADC 200 are used as the input values. The modulator input value selected by the second switch 320 is stored in the 48-chip input buffer 625. Meanwhile, the initial symbol synchronization and frame synchronization are acquired using the searcher during the preamble transfer period. Then, the synchronization position value is calculated and stored in the register. During the data transfer period, the tracking module 340 detects the channel variation. When the channel variation is detected, the synchronization position value 660 stored in the register is adjusted. Using the stored synchronization position values 660, the demodulator selects the 24-chip input values to be used in the actual demodulation process.

A first value 641 among the selected 24-chip input values and a value 631 stored in a first buffer among the channel estimation values are used as the input values of the first demodulation calculator 651. After signal processing, the result value 671 is transferred to the summer 680. A second value 642 among the selected 24-chip input values and a value 632 stored in a second buffer among the channel estimation values are used as the input values of the second demodulation calculator 652. After signal processing, the result value 672 is transferred to the summer 680. In the same way, the input values are inputted to the 24 demodulation calculators 651 to 654 and their result values 671 to 673 are transferred to the summer 680. The summer 680 compares the 24 input values with a predefined threshold value. When the input value is equal to or greater than the threshold value, the values are summed and transferred to the equalizer 230.

The symbols transferred to the equalizer 230 correspond to one symbol value before the transmitter uses the spreading code. Therefore, when the entire receiver is designed in the 24 parallel processing structures, only one symbol is processed when the system clock operates one time in the transmission mode in which the spreading code is 24. In the transmission mode in which the spreading code is 12, 2 symbols are processed when the system clock operates one time. In the transmission mode in which the spreading code is 6, 4 symbols are processed. In the transmission mode in which the spreading code is 4, 6 symbols are processed. In the transmission mode in which the spreading code is 3, 8 symbols are processed. In the transmission mode in which the spreading code is 2, 12 symbols are processed. In the transmission mode in which the spreading code is 1, 24 symbols are processed. The demodulator is designed in the parallel processing structures 600 to 603 so that a plurality of symbols can be processed when the system clock operates one time.

In addition, one 48-chip input buffer 625 is provided in the demodulation calculator. In order to obtain the 24-chip demodulator input value for symbol estimation when the system clock operates one time, the relative positions are calculated from the synchronization position value 660 and then 24 input values are selected from them. In this manner, the 24 demodulator input values for the symbol estimation can be obtained.

Figure 7:
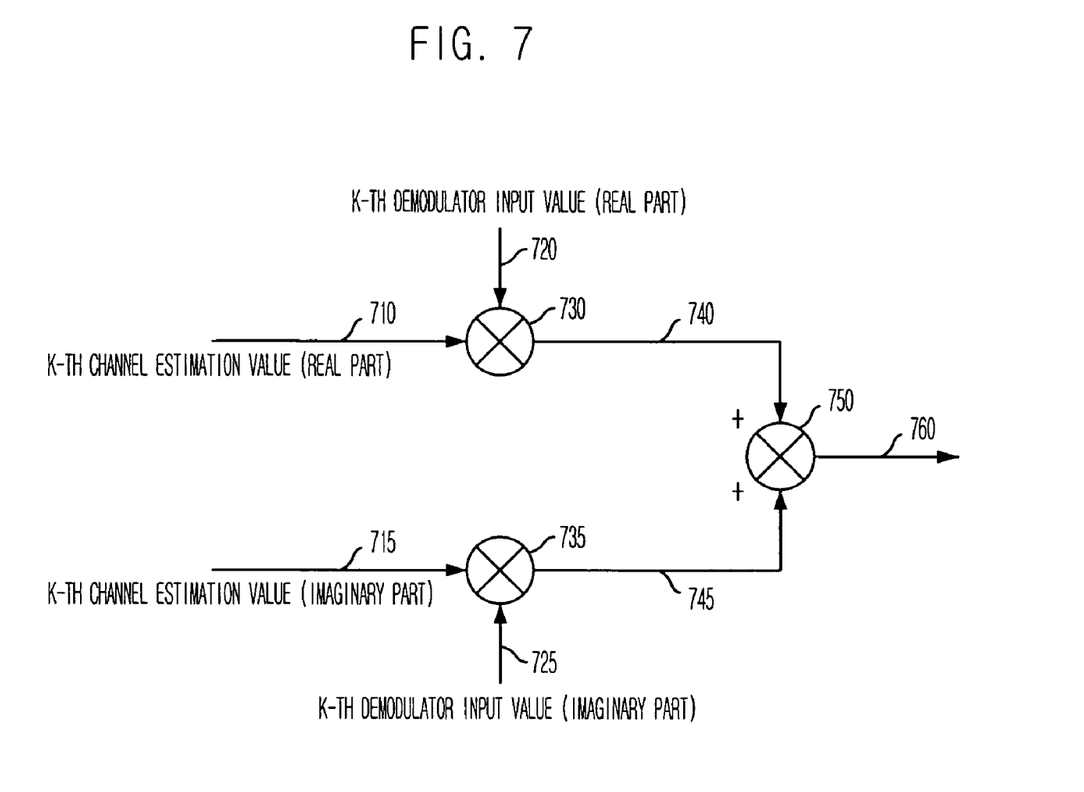
FIG. 7 is a detailed diagram of a demodulation calculator shown in FIG. 6.

FIG. 7 is a detailed diagram of the demodulation calculator shown in FIG. 6.

Referring to FIG. 7, the demodulation calculator includes a first multiplier 730 for multiplying the k-th real-part channel estimation value 710 by the k-th real-part demodulator input value, a second multiplier 735 for multiplying the k-th imaginary-part channel estimation value 715 by the k-th imaginary-part demodulator input value, and an adder 750 for adding the result values 740 and 745 of the first and second multipliers 730 and 735. The result value of the adder 750 is transferred to the summer 680 of the demodulator 350.

Figure 8:
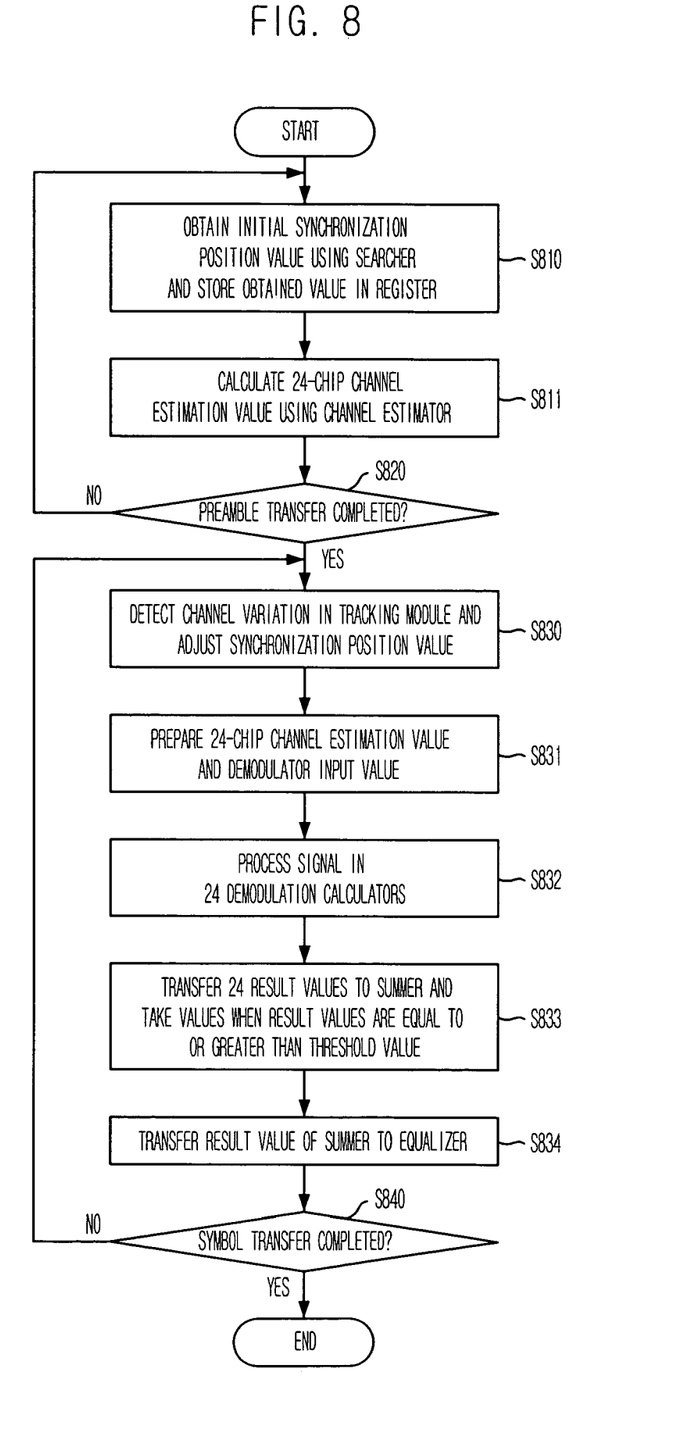
FIG. 8 is a flowchart illustrating a method for operating the DS-CDMA UWB receiver having the rake receiver in accordance with an embodiment of the present invention.

FIG. 8 is a flowchart illustrating a method for operating the DS-CDMA UWB modem receiver having the rake receiver in accordance with an embodiment of the present invention. The operation of the respective modules included in the receiver during one frame transfer period will be described below in detail.

Referring to FIG. 8, in step S810, the symbol synchronization and the frame synchronization are acquired using the synchronization acquisition sequence during the initial preamble transfer period, and the initial synchronization position is obtained and stored in the register. In step S811, the 24-chip channel estimation values are calculated in the channel estimator and stored in the buffer. When the preamble transfer is completed in step S820, the tracking module 340 continuously detects the channel variation during the data transfer period in step S830. In step S830, when the channel variation is detected, the synchronization position value stored in the register is adjusted. In step S831, the synchronization position value stored in the register, the 24-chip channel estimation value from the 24-chip buffer, and the demodulator input value from the 48-chip buffer are prepared. In step S832, the signals are processed in the 24 demodulation calculators by using the prepared input values. In step S833, the 24 result values are transferred to the summer and are summed when the result value is greater than the predefined threshold value. In step S834, the result value of the summer is transferred to the equalizer. In step S840, it is checked whether the data symbol transfer is completed. When the data symbol transfer is completed, the process is terminated. When the data symbol transfer is not completed, the process returns to step S830.

The described-above rake receiver for the DS-CDMA UWB system is merely illustrative and the present invention is not limited to this.

In accordance with the present invention, the spreading codes having length ranging from 1 to 24 can be processed using one structure. The present invention can also be efficiently applied to the UWB system requiring high-speed signal transmission by implementing the receiver in the parallel processing structure. Moreover, the 24-chip channel is estimated and used for signal demodulation. For example, when the length of the spreading code is 6, multiple signals corresponding to 4 symbol periods can be processed in the rake receiver. Consequently, the reception performance can be improved compared with the conventional rake receiver.

The present application contains subject matter related to Korean patent application No. 2005-0121055, filed with the Korean Intellectual Property Office on Dec. 9, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A rake receiver comprising:
a channel estimator for estimating a channel having a predetermined chip duration by using a synchronization acquisition sequence during a preamble transfer period;
a tracking module for detecting a channel variation during a data transfer period and adjusting a synchronization position value when the channel variation is detected;
a first switch for selecting one of an output value of an analog-to-digital converter and an output value of a correlator according to a length of a spreading code, and outputting the selected value to the tracking module;
a second switch for selecting one of the output value of the analog-to-digital converter and the output value of the correlator according to the length of the spreading code; and
a plurality of demodulators having a parallel processing structure to demodulate received signals by using the channel estimation value inputted from the channel estimator, the synchronization position value stored by the tracking module, and an output value of the second switch.

2. The rake receiver as recited in claim 1, further comprising a first buffer for buffering signals inputted from the analog-to-digital converter and outputting the buffered signals to the first and second switches.

3. The rake receiver as recited in claim 1, wherein each of the demodulators comprises:
a second buffer for storing the channel estimation value obtained using the synchronization acquisition sequence and a spreading code having a predetermined length during the preamble transfer period;
a third buffer for storing a demodulator input value inputted from the second switch;
a register for storing the synchronization position value;
a plurality of demodulation calculators for calculating complex values of the channel estimation values stored in the second and third buffers and complex values of the input values, the demodulation calculators being provided as many as the predetermined chip size; and
a summer for comparing the calculated value from the demodulators with a predefined threshold value and outputting the summed value is equal to or greater than the threshold value.

4. The rake receiver as recited in claim 3, wherein the second buffer is a 24-chip buffer.

5. The rake receiver as recited in claim 3, wherein the third buffer is a 48-chip buffer.

6. The rake receiver as recited in claim 5, wherein the third buffer is provided with one buffer, and calculates relative positions from the synchronization position value in order to obtain 24-chip demodulator input values for estimating the respective symbols when a system clock operates one time, and selects 24 input values from the calculated result.

7. The rake receiver as recited in claim 3, wherein the demodulation calculator comprises:
a first multiplier for multiplying a k-th real-part demodulator input value from the third buffer by a k-th real-part channel estimation value from the second buffer, where k is a predetermined value;
a second multiplier for receiving multiplying a k-th imaginary-part demodulator input value from the third buffer by a k-th imaginary-part channel estimation value from the second buffer; and
an adder for adding output values of the first and second multipliers.

8. The rake receiver as recited in claim 3, wherein the demodulator processes a plurality of symbols when a system clock operates one time.

9. A Direct-Sequence Code Division Multiple access (DS-CDMA) receiver comprising an analog-to-digital converter, a correlator for outputting a correlation value with respect to a predetermined number of signals inputted from the analog-to-digital converter, a rake receiver, an equalizer, and a Viterbi decoder, wherein the rake receiver comprises:
a channel estimator for estimating a channel having a predetermined chip duration by using a synchronization acquisition sequence during a preamble transfer period;
a tracking module for detecting a channel variation during a data transfer period and adjusting a synchronization position value when the channel variation is detected;
a first switch for selecting one of an output value of an analog-to-digital converter and an output value of a correlator according to a length of a spreading code and outputting the selected value to the tracking module;
a second switch for selecting one of an output value of the analog-to-digital converter and an output value of the correlator according to the length of the spreading code; and
a plurality of demodulators having a parallel processing structure to demodulate received signals by using the channel estimation value inputted from the channel estimator, the synchronization position value stored by the tracking module, and an output value of the second switch.

10. The DS-CDMA receiver as recited in claim 9, wherein the correlator comprises:
a fourth buffer having a predetermined chip size and buffering a predetermined number of complex input values received from the analog-to-digital converter; and
a plurality of correlation calculators for performing a correlation calculation operation with a spreading code used in a signal transfer by using the complex values outputted from the fourth buffer, and outputting result values, the correlation calculators being provided as many as the predetermined chip size.

11. The DS-CDMA receiver as recited in claim 10, further comprising a first buffer for buffering signals inputted from the analog-to-digital converter and outputting the buffered signals to the first and second switches.

12. The DS-CDMA receiver as recited in claim 11, wherein each of the demodulators comprises:

- a second buffer for storing the channel estimation value obtained using the synchronization acquisition sequence and a spreading code having a predetermined length during the preamble transfer period;
- a third buffer for storing a demodulator input value inputted from the second switch;
- a register for storing the synchronization position value;
- a plurality of demodulation calculators for calculating complex values of the channel estimation values stored in the second and third buffers and complex values of the input values, the demodulation calculators being provided as many as the predetermined chip size; and
- a summer for comparing the calculated value from the demodulators with a predefined threshold value and outputting the summed value is equal to or greater than the threshold value.

13. The DS-CDMA receiver as recited in claim 12, wherein the third buffer is provided with one buffer, and calculates relative positions from the synchronization position value in order to obtain 24-chip demodulator input values for estimating the respective symbols when a system clock operates one time, and selects 24 input values from the calculated result.

14. The DS-CDMA receiver as recited in claim 12, wherein the demodulator processes a plurality of symbols when a system clock operates one time.

* * * * *